United States Patent
Sun et al.

(10) Patent No.: US 12,206,524 B1
(45) Date of Patent: Jan. 21, 2025

(54) MULTI-ACCESS GATEWAY WITH INTELLIGENT CONVERGENCE (MAGIC)

(71) Applicant: Cable Television Laboratories, Inc., Louisville, CO (US)

(72) Inventors: Ruoyu Sun, Westminster, CO (US); Jingjie Zhu, Erie, CO (US); Junwen Zhang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 167 days.

(21) Appl. No.: 17/384,208

(22) Filed: Jul. 23, 2021

Related U.S. Application Data

(60) Provisional application No. 63/055,432, filed on Jul. 23, 2020.

(51) Int. Cl.
*H04L 12/66* (2006.01)
*H04L 41/0654* (2022.01)
*H04L 43/0876* (2022.01)

(52) U.S. Cl.
CPC .......... *H04L 12/66* (2013.01); *H04L 41/0654* (2013.01); *H04L 43/0876* (2013.01)

(58) Field of Classification Search
CPC .. H04L 12/66; H04L 41/0654; H04L 43/0876
See application file for complete search history.

(56) References Cited

U.S. PATENT DOCUMENTS

| | | | |
|---|---|---|---|
| 7,203,190 B1 * | 4/2007 | Ruban | H04L 12/2876 370/395.42 |
| 2014/0280910 A1 * | 9/2014 | Swig | H04L 45/308 709/224 |
| 2014/0334496 A1 * | 11/2014 | Ray | H04L 65/1026 370/401 |
| 2015/0106491 A1 * | 4/2015 | Gardner | H04L 12/4641 709/223 |
| 2016/0366063 A1 * | 12/2016 | Cicic | H04L 12/66 |
| 2017/0134186 A1 * | 5/2017 | Mukundan | H04L 47/41 |
| 2017/0279715 A1 * | 9/2017 | Li | H04L 45/20 |
| 2020/0136864 A1 * | 4/2020 | McBride | H04L 12/2876 |

FOREIGN PATENT DOCUMENTS

| | | | | |
|---|---|---|---|---|
| CN | 106302168 A | * | 1/2017 | ........... H04L 45/121 |
| CN | 107332793 A | * | 11/2017 | ............. H04L 12/66 |

* cited by examiner

*Primary Examiner* — Kibrom T Hailu
*Assistant Examiner* — Kai Chang
(74) *Attorney, Agent, or Firm* — Josh C. Snider; Snider IP

(57) ABSTRACT

Multi-access gateways with intelligent convergence (MAGIC gateways) for use on client premises intelligently distribute user equipment network traffic to/from a plurality of Internet service providers (ISPs), without any change on the ISP network side. Use of a MAGIC gateway improves network reliability by providing redundancy and distributing traffic to those ISPs that provide the best service parameters for the type of traffic being transmitted.

18 Claims, 3 Drawing Sheets

MULTI-ACCESS GATEWAY WITH INTELLIGENT CONVERGENCE (MAGIC)

CROSS-REFERENCE TO RELATED APPLICATIONS

This application claims the benefit of and priority to U.S. Provisional Patent Application No. 63/055,432, filed Jul. 23, 2020, which is hereby incorporated by reference in its entirety.

STATEMENT REGARDING FEDERALLY SPONSORED RESEARCH

None.

BACKGROUND

Internet reliability is a crucial issue for people working from home because outages may lead to lost revenue, loss of counterparty confidence, and/or job loss. The demand for internet services, such as video conference streaming, data upload speed, and Cloud access in nearly every home, has strained the resources of internet service providers (ISPs) and left many customers looking for ways to add redundancy to guard against service outages.

SUMMARY

Devices, software, network architectures, and methods for intelligently distributing network traffic to/from a plurality of ISPs, without any change on the ISP network side, are disclosed herein. The instrumentalitites described herein analyze and monitor network performance, prioritize traffic based on user preferences, and transition between ISPs in response to outages or to dynamically optimize quality of experience.

In an aspect, a multi-access gateway with intelligent convergence (MAGIC gateway) comprises a local network router connected to at least two interfaces with each interface in operable communication with a different Internet service provider (ISP) via a transmission medium where the transmission media of the interfaces differ from one another. For example, a transmission medium may be selected from the group consisting of a coaxial electrical cable, a hybrid fiber coaxial cable, an optical cable, a wireless transmission medium and combinations thereof.

In an embodiment, the at least two interfaces are selected from the group consisting of Ethernet ports, antennas, cable ports, optical ports, and Digital Subscriber Line (DSL) ports.

In an embodiment, the at least two interfaces are selected from the group consisting of a Data Over Cable Service Interface Specification (DOCSIS) modem, a fiber modem, a Digital Subscriber Line (DSL) modem, a 5G New Radio (NR) modem, an LTE modem, and a satellite modem.

In an aspect, a multi-access gateway with intelligent convergence (MAGIC gateway) comprises a router controlled by a processor, the processor configured to: (i) monitor local network traffic; (ii) identify characteristics of a first portion of the local network traffic; (iii) select an Internet Service Provider (ISP) from a plurality of ISPs for the first portion of the local network traffic; and (iv) instruct the router to route the first portion of the local network traffic to the selected ISP via one of at least two interfaces each in operable communication with different ISPs and with the router.

In an embodiment, a memory accessible by the processor comprises one or more iptables for matching characteristics of the first portion of the local network traffic to characteristics of at least one of the plurality of ISPs, and potentially to at least one secondary ISP and/or at least one tertiary ISP.

In an embodiment, the at least two interfaces are the same type of interface, such as cable interfaces connected to two different cable ISP x-haul systems. In an embodiment, the at least two interfaces are different types of interfaces, such as a cable interface and an optical interface.

In an embodiment, a processor of the MAGIC gateway is in operable communication with a graphical user interface (GUI). For example, the GUI may allow an end user to provide instructions to the processor to prioritize specific types of traffic (e.g., upload traffic) or traffic associated with a particular application(s) (e.g., video streaming applications) over other types of traffic.

In an aspect, a non-transitory computer-readable medium has a plurality of non-transitory instructions executable with a processor for routing local network traffic to a plurality of Internet service providers (ISPs), the plurality of non-transitory instructions being executable for: (i) monitoring local network traffic; (ii) identifying characteristics of a first portion of the local network traffic; (iii) selecting an ISP from a plurality of ISPs for the first portion of the local network traffic; and (iv) instructing a router within a client gateway, such as a MAGIC gateway, to route the first portion of the local network traffic to the selected ISP.

In an embodiment, the plurality of non-transitory instructions are further executable for identifying characteristics of a second portion of the local network traffic on the local network; selecting another ISP from the plurality of ISPs for the second portion; and routing the second portion to the other ISP.

In an embodiment, routing the first portion to the selected ISP further comprises re-routing existing network traffic from the selected ISP to a new ISP.

In an embodiment, selecting the ISP from the plurality of ISPs comprises utilizing one or more iptables to match the characteristics of the first portion of the local network traffic to network parameters associated with at least one of the plurality of ISPs.

In an embodiment, the plurality of non-transitory instructions are further executable for evaluating an allocation of existing traffic to the plurality of ISPs and re-routing the existing traffic to achieve a new allocation of traffic among the plurality of ISPs.

In an embodiment, the plurality of non-transitory instructions are further executable for prioritizing traffic according to user preferences or according to default preferences.

In an embodiment, monitoring the local network traffic comprises detecting a network outage associated with one of the plurality of ISPs and re-routing traffic from the one ISP suffering the network outage to another ISP of the plurality of ISPs.

In an embodiment, monitoring local network traffic comprises one or more of: (i) measuring latency associated with transmissions to/from each of the plurality of ISPs, (ii) monitoring bandwidth throughput of each of the plurality of ISPs, (iii) monitoring SINR for each of the plurality of ISPs, (iv) monitoring spectrum frequencies of each of the plurality of ISPs, (v) monitoring airtime utilization for each of the plurality of ISPs, (vi) monitoring outages for each of the plurality of ISPs, and (vii) monitoring amount of data usage for downloading and/or uploading for each of the plurality of ISPs.

BRIEF DESCRIPTION OF THE DRAWINGS

Illustrative embodiments of the present invention are described in detail below with reference to the attached drawings.

DETAILED DESCRIPTION

Figure 1:
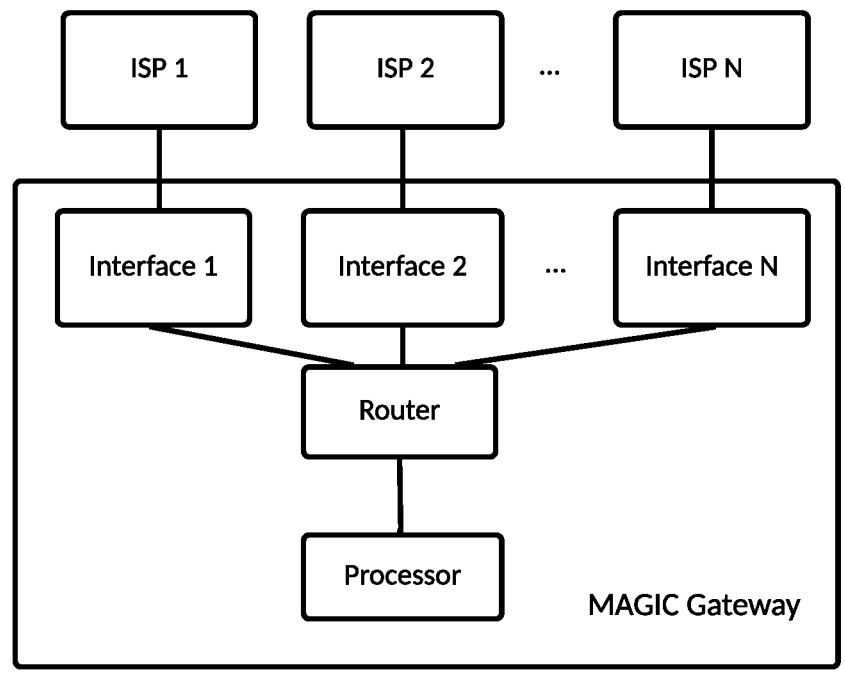
FIG. 1 is a block diagram of a MAGIC gateway, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

FIG. 1 is a block diagram of a MAGIC gateway, according to an embodiment. The MAGIC gateway includes a router controlled by a processor, which may reside within the router and which typically includes an OpenWrt operating system. The router is connected to two or more interfaces (Interface1, Interface 2 . . . . Interface N, where N is an integer greater than or equal to 3). Each interface is in operable communication with a different Internet service provider (ISP) (ISP 1, ISP 2 . . . . ISP N, where N is an integer greater than or equal to 3) via a transmission medium of an x-haul system. The interfaces may, for example, be Ethernet, LTE, cable, HFC, optical, DSL or antenna ports for receiving connections from a plurality of modems, which would be independent from the MAGIC gateway in the present example. Generally, the transmission media of the interfaces differ from one another. For example, the transmission media may be selected from coaxial electrical cable, hybrid fiber coaxial cable, optical cable (fiber), or wireless transmission media.

Figure 2:
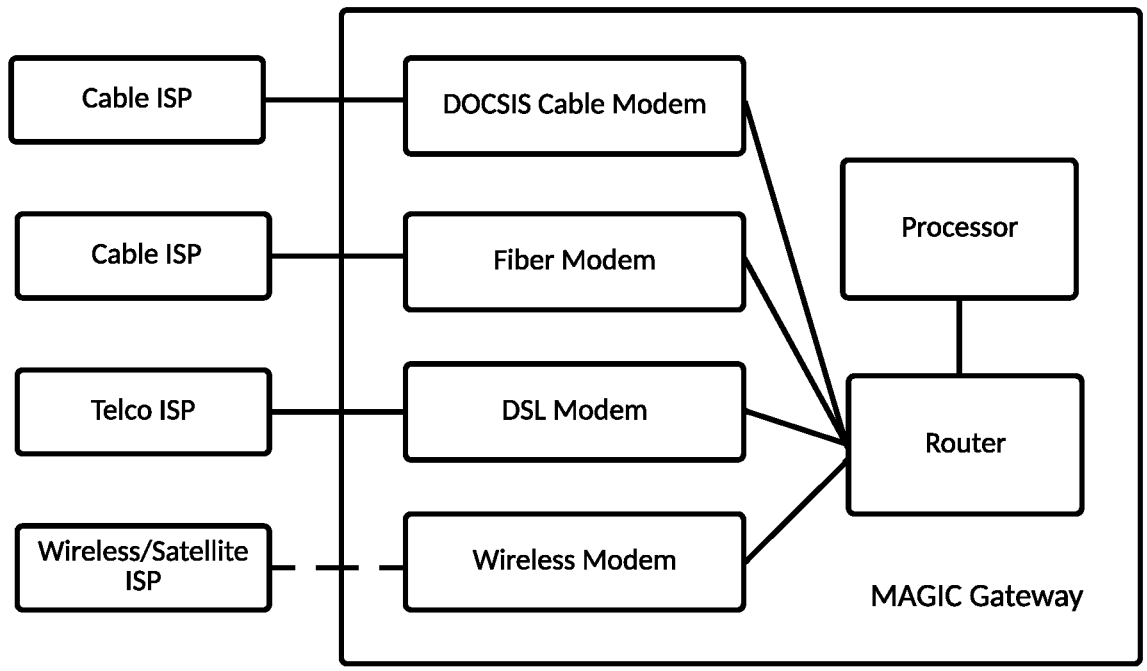
FIG. 2 is a block diagram of a MAGIC gateway with integrated modems, according to an embodiment.

FIG. 2 is a block diagram of a MAGIC gateway with integrated modems, according to an embodiment. In addition to the processor and router described with respect to FIG. 1, a plurality of modems are integrated within the MAGIC gateway. Each of the modems is connected to a different type of transmission medium for communication with an ISP. In the example shown, a wireless modem communicates via radio frequency signals (dashed line) with a remote radio head or satellite, a DSL modem communicates via a electrical cable with a telco central office, fiber modem communicates with a cable ISP via an optical cable, and a DOCSIS cable modem communicates with a cable ISP via a hybrid fiber coaxial cable. The cable ISPs accessed via the fiber and HFC media may be the same ISP or different ISPs. In an embodiment, two or more interfaces and/or modems may access the same type of transmission medium (e.g., HFC) with each transmission medium accessing a different cable ISP.

In the case of FIG. 1 or FIG. 2, the processor is configured to monitor local network traffic. For example, the processor may provide instructions for each of the modems to generate a test signal, which will measure latency associated with transmission to/from each of the plurality of ISPs, thereby determining which transmission medium/x-haul system/ISP combination provides the lowest latency. The processor may also or alternatively monitor bandwidth capacity of each of the plurality of ISPs, SINR for each of the plurality of ISPs, spectrum frequencies allocated to each of the plurality of ISPs, and various other network parameters. The processor also identifies characteristics of at least a portion of the local network traffic. For example, the processor may detect a network outage when all traffic ceases, or the processor may identify when a new application is opened on user equipment (UE) within the local network and which type of traffic the application will require (e.g., low latency for streaming or real-time stock quotes, upload or download capacity for transferring files, etc.). Based on the characteristics of the local network traffic, the processor selects an Internet Service Provider (ISP) from a plurality of ISPs for at least a portion of the local network traffic. For example, a memory accessible by the processor may contain one or more iptables for matching characteristics of the local network traffic to network parameters associated with at least one of the plurality of ISPs and/or to a secondary or tertiary ISP that will be assigned if the primary ISP is unavailable. An exemplary iptable is provided as Table 1, although it will be appreciated that iptable data will differ between gateways and for the same gateway over time. In other words, an iptable for a single gateway is dynamic and will change as monitored network parameters change. For example, a network outage will completely remove a particular ISP from the table for a time.

TABLE 1

| Application Type | Characteristic(s) | Primary ISP | Secondary ISP |
|---|---|---|---|
| Video Streaming | Low latency | DSL | Fiber |
| Gaming | Low latency | DSL | Fiber |
| Uploading Data | High capacity | DOCSIS | DSL |
| Voice over IP | Low latency/ mobility | Wireless | Fiber |

Once an ISP has been selected, the processor instructs the router to route at least a portion of the local network traffic to the selected ISP via an interface (and optionally integrated modem) of the MAGIC gateway.

In some embodiments, the processor is in operable communication with a graphical user interface (GUI) that allows an end user to prioritize certain application types. In that case, the processor will ensure that traffic from the prioritized application type or from a prioritized device will be routed to the primary (best) ISP, even if that means transferring existing traffic from the primary ISP to a different (e.g., secondary or tertiary) ISP.

Figure 3:
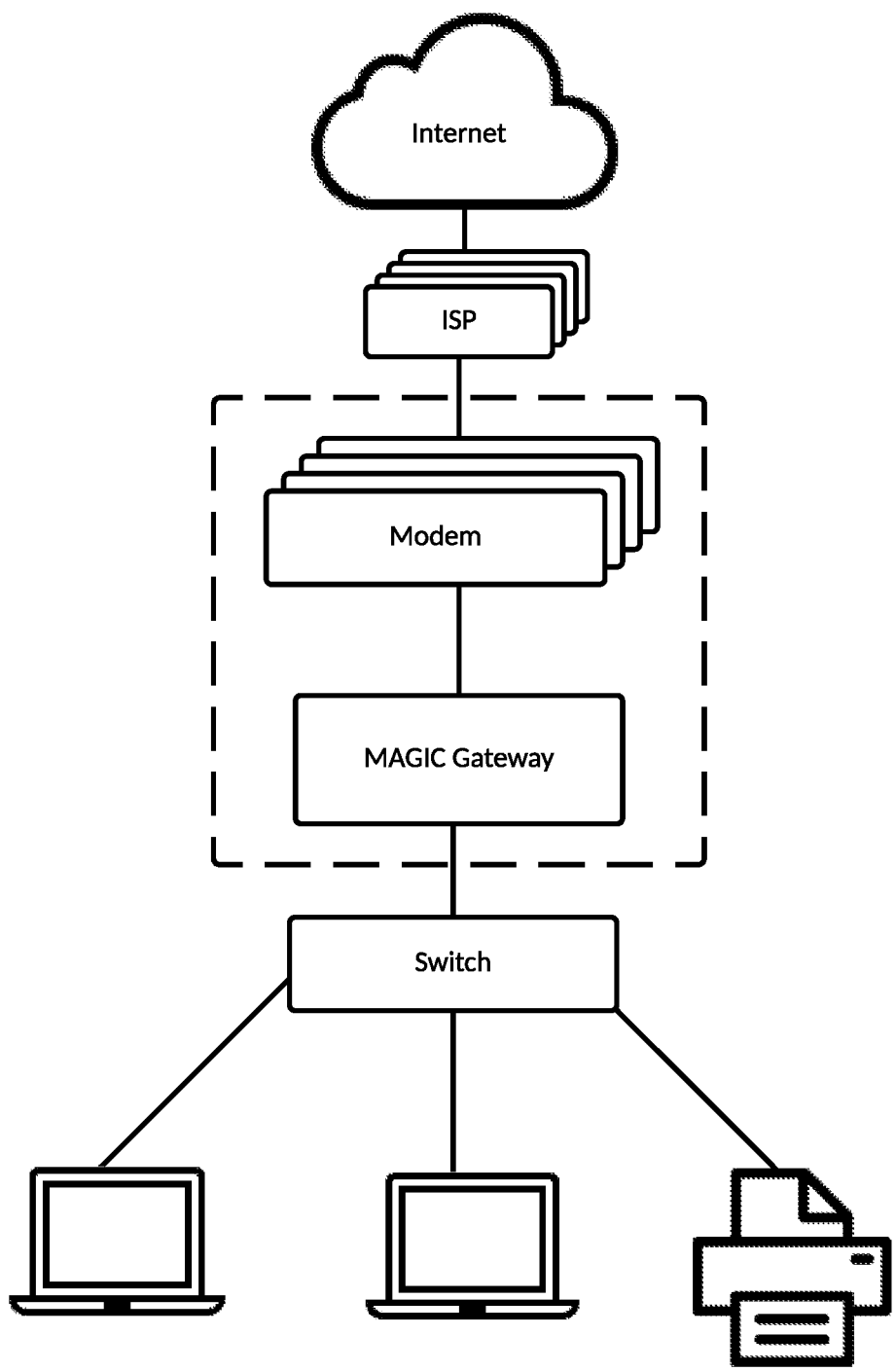
FIG. 3 is a schematic of a MAGIC gateway within a network architecture, according to an embodiment.

FIG. 3 is a schematic of a MAGIC gateway within a network architecture. User equipment, such as computers and printers, make up the local network which is connected to a MAGIC gateway by a switch that routes traffic to the appropriate device based on MAC address. The MAGIC gateway may be the device of FIG. 1, with external modems, or the device of FIG. 1 including integrated modems (represented by the dashed box). The MAGIC gateway is in operable communication with a plurality of ISPs, which provide access to the Internet.

Figure 4:
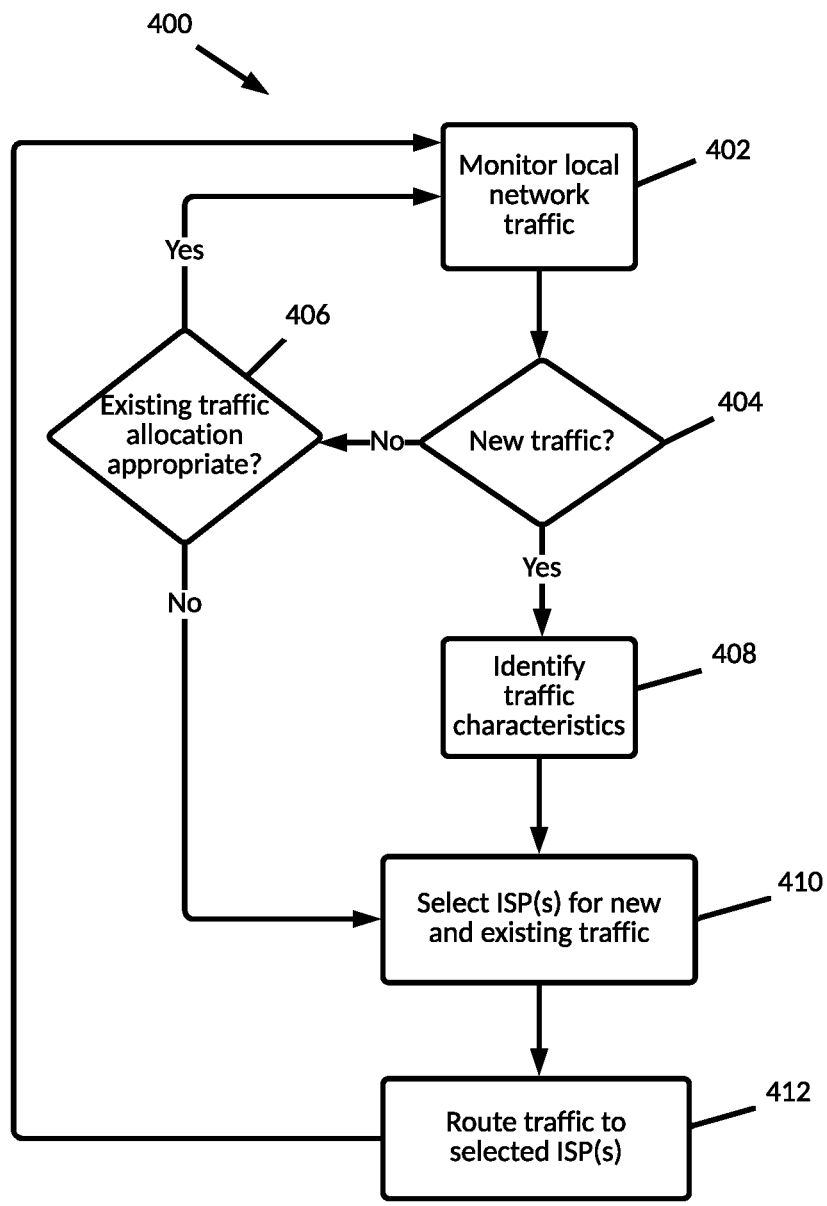
FIG. 4 is a flowchart of instructions carried out by a processor for routing local network traffic to a plurality of Internet service providers (ISPs), according to an embodiment.

FIG. 4 is a flowchart 400 showing instructions carried out by a processor for routing local network traffic to a plurality of Internet service providers (ISPs), according to an embodiment. In step 402, the processor monitors local network traffic. When new traffic is identified, e.g., because a new application is opened on a UE within the local network, in step 404, the processor identifies characteristics of the local network traffic (step 408), selects an ISP from a plurality of ISPs (step 410), and instructs a router within a client gateway, such as a MAGIC gateway, to route the local network traffic to the selected ISP(s) (step 412). The process is then repeated. If no new traffic is identified in step 404, the processor continuously checks that the allocation of existing traffic across the ISPs is appropriate/optimal for the current network conditions. If the allocation of existing traffic can be improved, new ISPs are selected (step 410), traffic is routed according to the newly selected ISPs (step 412), and the process is repeated.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A multi-access gateway with intelligent convergence (MAGIC gateway), comprising:
    a router; and
    a processor in communication with a memory device configured to store computer-executable instructions therein, which, when executed by the processor, cause the processor to:
        (i) monitor local network traffic from a user equipment device (UE);
        (ii) identify a first application type operating on the UE;
        (iii) based on the first application type, select a first Internet Service Provider (ISP) from a plurality of ISPs for the local network traffic;
        (iv) instruct the router to route local network traffic related to the first application from the UE to the first ISP a first interface of at least two interfaces each in operable communication with the router, wherein the first interface is in operable communication with the first ISP;
        (v) continue to monitor local network traffic from the UE;
        (vi) identify, after instructing the router to route the local traffic to the first ISP, a second application type operating on the UE; and
        (vii) instruct the router to route local network traffic related to the second application from the UE to a second interface of the at least two interfaces, wherein the second interface is different from the first interface, and wherein the second interface is in operable communication with a second ISP different from the first ISP.

2. The MAGIC gateway of claim 1, wherein the memory is further configured to include one or more iptables for matching a traffic characteristic of an identified application type to network parameters associated with at least one of the plurality of ISPs.

3. The MAGIC gateway of claim 1, wherein the at least two interfaces are selected from the group consisting of Ethernet ports, antennas, cable ports, optical ports, and Digital Subscriber Line (DSL) ports.

4. The MAGIC gateway of claim 1, wherein the at least two interfaces are selected from the group consisting of a Data Over Cable Service Interface Specification (DOCSIS) modem, a fiber modem, a Digital Subscriber Line (DSL) modem, a 5G New Radio (NR) modem, an LTE modem, and a satellite modem.

5. The MAGIC gateway of claim 1, wherein the at least two interfaces are the same type of interface.

6. The MAGIC gateway of claim 1, wherein the at least two interfaces are different types of interfaces.

7. The MAGIC gateway of claim 1, wherein the first application type is selected from the group consisting of a streaming application, a real-time data application, a video conferencing application, a gaming application, a voice-over-IP application, an uploading application, a downloading application, and a file transfer application.

8. The MAGIC gateway of claim 2, wherein the traffic characteristic of the first application type is selected from the group consisting of low latency, high bandwidth capacity, low SINR, high upload speed, high download speed, and mobility.

9. A non-transitory computer-readable medium configured to store a plurality of non-transitory computer-executable instructions therein for a processor in operable communication with a router configured for routing local network traffic to a plurality of Internet Service Providers (ISPs), which, when executed by the processor, the plurality of non-transitory computer-executable instructions cause the processor to:
    (a) monitor local network traffic from a first user equipment device (UE) in communication with the router;
    (b) identify a first application type operating on the first UE, wherein the first application type is responsible for a first portion of the local network traffic;
    (c) select, based on the application type, a first ISP from the plurality of ISPs for the first portion of the local network traffic;
    (d) instruct the router, within a client gateway, to route the first portion of the local network traffic to the first ISP a first interface of at least two interfaces each in operable communication with different ISPs and with the router, wherein the first interface is in operable communication with the first ISP;
    (e) identify a second application type operating on the first UE, wherein the second application type is responsible for a second portion of the local network traffic different from the first portion; and
    (f) instruct the router to route the second portion of the local network traffic from the UE to a second interface of the at least two interfaces, wherein the second interface is different from the first interface, and wherein the second interface is in operable communication with a second ISP different from the first ISP.

10. The non-transitory computer-readable medium of claim 9, wherein the plurality of non-transitory instructions further cause the processor to:
    (g) identify a third application type operating on a second UE, wherein the third application type is also configured to be responsible the second portion of the local network traffic on the local network; and (h) route the second portion of the local network traffic on the local network from the second UE to the second ISP.

11. The non-transitory computer-readable medium of claim 9, wherein the instructions for routing the first portion to the first ISP further include sub-instructions for re-routing existing network traffic from the first ISP to a third ISP of the plurality of ISPs different from the first ISP.

12. The non-transitory computer-readable medium of claim 9, wherein the instructions to select the first ISP from the plurality of ISPs utilize one or more iptables to match a traffic characteristic of the first application type to network parameters associated with the first ISP.

13. The non-transitory computer-readable medium of claim 9, wherein the plurality of non-transitory instructions are further configured to cause the processor to evaluate an allocation of existing traffic to the plurality of ISPs and re-route the existing traffic to achieve a new allocation of traffic among the plurality of ISPs.

14. The non-transitory computer-readable medium of claim 9, wherein the plurality of non-transitory instructions are further configured to cause the processor to prioritize traffic according to user preferences or according to default preferences.

15. The non-transitory computer-readable medium of claim 9, wherein the instructions to monitor the local network traffic include sub-instructions for detecting a network outage associated with one of the plurality of ISPs and re-routing traffic from a one ISP suffering the network outage to different ISP of the plurality of ISPs.

16. The non-transitory computer-readable medium of claim 9, wherein the instructions for monitoring the local network traffic are based on sub-instructions configured for one or more of:
  (i) measuring latency associated with transmissions to/from each of the plurality of ISPs;
  (ii) monitoring bandwidth throughput of each of the plurality of ISPs;
  (iii) monitoring SINR for each of the plurality of ISPs;
  (iv) monitoring spectrum frequencies of each of the plurality of ISPs;
  (v) monitoring airtime utilization for each of the plurality of ISPs;
  (vi) monitoring outages for each of the plurality of ISPs; and
  (vii) monitoring amount of data usage for downloading and/or uploading for each of the plurality of ISPs.

17. The non-transitory computer-readable medium of claim 12, wherein the traffic characteristic of the first application type is selected from the group consisting of low latency, high bandwidth capacity, low SINR, high upload speed, high download speed, and mobility.

18. The non-transitory computer-readable medium of claim 12, wherein the first application type is selected from the group consisting of a streaming application, a real-time data application, a video conferencing application, a gaming application, a voice-over-IP application, an uploading application, a downloading application, and a file transfer application.

* * * * *